United States Patent
Defoort

(10) Patent No.: US 8,638,798 B2
(45) Date of Patent: *Jan. 28, 2014

(54) METHOD AND ARRANGEMENT TO INCREASE THE DATA TRANSMISSION FLOW RATE IN A COMMUNICATION SYSTEM

(75) Inventor: Frank Cyriel Michel Defoort, Kruibeke-Bazel (BE)

(73) Assignee: Alcatel Lucent, Paris (FR)

( * ) Notice: Subject to any disclaimer, the term of this patent is extended or adjusted under 35 U.S.C. 154(b) by 75 days.

This patent is subject to a terminal disclaimer.

(21) Appl. No.: 13/022,408

(22) Filed: Feb. 7, 2011

(65) Prior Publication Data

US 2011/0150003 A1 Jun. 23, 2011

Related U.S. Application Data

(63) Continuation of application No. 12/262,697, filed on Oct. 31, 2008, now Pat. No. 7,903,664, which is a continuation of application No. 10/345,218, filed on Jan. 16, 2003, now Pat. No. 7,447,210.

(30) Foreign Application Priority Data

Jan. 21, 2002 (EP) .................................. 02290154

(51) Int. Cl.
*H04L 12/28* (2006.01)

(52) U.S. Cl.
USPC ...................................... 370/395.1

(58) Field of Classification Search
None
See application file for complete search history.

(56) References Cited

U.S. PATENT DOCUMENTS

| | | | |
|---|---|---|---|
| 6,289,014 B1 | 9/2001 | Hoshino et al. | |
| 6,963,570 B1 | 11/2005 | Agarwal | |
| 7,095,745 B2 | 8/2006 | Tomizawa | |
| 7,154,895 B1 | 12/2006 | Bornemisza et al. | |
| 7,447,210 B2 * | 11/2008 | Defoort | 370/395.1 |
| 7,903,664 B2 * | 3/2011 | Defoort | 370/395.1 |

FOREIGN PATENT DOCUMENTS

| | | |
|---|---|---|
| EP | 1143680 A2 | 10/2001 |
| WO | 99/04522 A1 | 1/1999 |

OTHER PUBLICATIONS

M.M. Khatib, "New throughput enhancing techniques for wireless ATM networks," 2000 IEE Wireless Communicationas and Networking Conference. Conference Record (Cat. No. TH008540), Proceedings of IEEE Conference on Wireless Communications and Networking, Chicago, IL, USA Sep. 23-28, 2000, pp. 1516-1520, vol. 3, XP002205414 2000.

T. Wolf et al., "Tags for high performance active networkds," Open Architechtures and Network Programming 2000. Proceedings. Openarch 2000. 2000 IEEE Third Conference in Tel Aviv, Israel Mar. 26-27, 2000, NJ, pp. 37-44, XP010376201.

H. Bussey et a., "A second generation prototype for broadband integrated access and packet switching," Bell Communications Research, XP10071776.

* cited by examiner

*Primary Examiner* — Anh-Vu Ly

(74) *Attorney, Agent, or Firm* — Sughrue Mion, PLLC

(57) ABSTRACT

A method and apparatus to transfer data cells having an overhead section and a payload section via a communication medium from a transmitter to a receiver. Before transfer of a data cell, the overhead section of the data cell is translated into a shortened overhead section, known both on the transmitter and the receiver sides, and upon reception of the data cell, the shortened overhead section is translated again into the overhead section.

5 Claims, 2 Drawing Sheets

METHOD AND ARRANGEMENT TO INCREASE THE DATA TRANSMISSION FLOW RATE IN A COMMUNICATION SYSTEM

CROSS REFERENCE TO RELATED APPLICATION

This is a continuation of application Ser. No. 12/262,697 filed Oct. 31, 2008, which is a continuation of application Ser. No. 10/345,218 (U.S. Pat. No. 7,477,210) filed Jan. 16, 2003, the contents of all of which are incorporated herein by reference in their entirety.

BACKGROUND OF THE INVENTION

The present invention concerns a method and an arrangement to increase the data transmission flow rate in a communication system, preferably using Asynchronous Transfer Mode.

In a communication system operating under the Asynchronous Transfer Mode (ATM), data is transmitted by packets or cells of fixed size and structure. Such fixed cell size is of 53 octets (bytes) wherein 48 octets are allocated to code the data to be transmitted, in a part of the cell called payload (PL), and 5 octets are allocated to form a header (H) of the cell.

A cell header carries the information necessary for the communication system to determine to which connection, and finally, to which address, each cell should be delivered. In such a system, as in every communication system, it is desirable to increase the data flow rate by using the same communication resources. Up to now, the usual way to achieve this goal is to use complex compression algorithms.

The invention provides an increase of data flow rate without the necessity of using complex compression algorithms.

BRIEF SUMMARY OF THE INVENTION

Therefore, the invention concerns generally a method to increase, in a simple way, data transmission flow rate in a communication system making use of data cells, for instance ATM cells, having an overhead section and a payload section.

This method is characterised in that, before the transfer of a data cell from a transmitter to a receiver, the overhead section of the data cell is translated into a shortened overhead section and, upon reception of the data cell, the shortened overhead section is again translated into the overhead section, said overhead section and shortened overhead section being known both at transmission and reception sides.

As many cells having the same overhead are generally transmitted, it is possible to obtain a gain in the flow rate in spite of the fact that it is temporally necessary to transmit more information, i.e. the correspondance between the overhead section and the shortened overhead section. In other words, contrary to the usual techniques, which use data compression algorithms, the invention is based on the recognition that a great number of same headers are transmitted during a communication and that the repetitive headers may be represented by shorter headers.

In an embodiment, a translation table is memorised at the transmission side and at the reception side for associating a shortened overhead section to a overhead section.

For instance, the overhead section is a header which comprises five bytes and the shortened overhead section is a header comprising one byte.

In an embodiment, when the overhead section is not memorised in the table, this overhead section and its associated shortened overhead section, are memorised in a new entry of said table both on the transmission and reception sides.

In that case, preferably, when said table is full, the new entry replaces a least intensively used entry of the table both on the transmission and reception sides.

Preferably, a new entry is communicated via an update cell from the transmission to the reception sides.

The update cell is repeated several times, for instance three times.

In an example, the shortened overhead section comprises one byte with 5 value bits and 3 cyclic redundancy bits.

In an embodiment, when the transfer of data cells is operated through a DSL technology, wherein idle cells are provided, the payload of the idle used is used to transmit an overhead section and a shortened overhead section.

The invention concerns also a transmitter adapted to transfer data cells having an overhead section and a payload section via a communication medium from this transmitter to a receiver, this transmitter comprising:

a. a terminal adapted to receive a data cell; and
b. transmit means adapted to transmit said data cell, this transmitter being characterized in that it further comprises:
c. memory means, adapted to memorise a table of overhead sections (H1, H2, H3, . . . , Hi, . . . , H31) and associated shortened overhead sections;
d. update communication means, interconnected with said memory means and adapted to communicate to said receiver each update of an entry in said table; and
e. overhead translating means, coupled between said receiving terminal and said transmit means and interconnected with said memory means, said overhead translating means being adapted to translate, before transmission of said data cell, an overhead section (Hi) of said data cell into a shortened overhead section (SHi), associated with said overhead section (Hi) in said table.

The invention concerns also a receiver for receiving transferred data cells having an overhead section (Hi) and a payload section (PL) via a communication medium (50) from a transmitter (42) to said receiver, said receiver comprising:

a. reception means (55) adapted to receive a data cell; and
b. a terminal (60) adapted to source said data cell, this receiver being characterized in that it further comprises:
c. memory means, adapted to memorise a table (54) of overhead sections and associated shortened overhead sections;
d. update means (56), interconnected with said memory means and adapted to update an entry in said table in accordance with information communicated to said receiver by said transmitter; and
e. overhead translating means (58), coupled between said reception means (55) and said terminal (50) and interconnected with said memory means, said overhead translating means being adapted to translate, upon reception of said data cell, a shortened overhead section (SHi) of said data cell into an overhead section (Hi), associated with said shortened overhead section (SHi) in said table.

BRIEF DESCRIPTION OF THE DRAWINGS

Other features and advantages of the invention will be best understood by referring to the following description of an embodiment of the invention taken in conjunction with the accompanying drawings wherein.

DETAILED DESCRIPTION OF THE EXEMPLARY EMBODIMENTS

Figure 1:
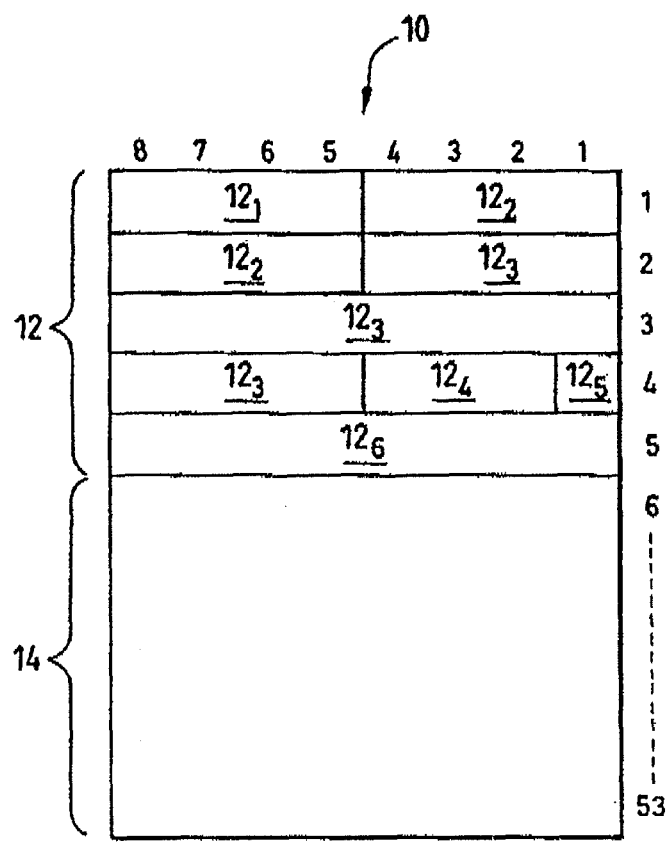
FIG. 1 represents the known structure of a User Network Interface cell transmitted according to the Asynchronous Transfer Mode.

As represented in FIG. 1, a User Network Interface cell header 12 of an ATM cell 10 comprises a standardized structure with the following elements:

A Generic Flow Control (GFC) element $12_1$ coded with 4 bits. This GFC element $12_1$ is allocated to local functions i.e. to functions proper to the user transmitting such cell 10.

A Virtual Path Identifier (VPI) element $12_2$ coded with 8 bits, this number being variable according to the user connection to the system.

A Virtual Channel Identifier (VCI) element $12_3$ coded with 16 bits, such number being also variable according to the user connection to the communication system.

A Payload Type (PT) element $12_4$ coded with 3 bits. This PT element $12_4$ indicates whether the information transmitted by the cell 10 relates to the data transmitted by the user or to the connection management of the system.

A Cell Load Priority (CLP) element $12_5$ coded with 1 bit. The CLP element $12_5$ informs the communication system of whether it can eliminate the cell 10, for instance, in case of congestion of the communication system.

A Header Error Control (HEC) element $12_6$ coded with bits. This HEC element $12_6$ allows the detection and the correction of errors in the data carried by the header 12 by using a dedicated cyclic code.

In combination with the ATM technique, communication systems may use digital subscriber line (DSL) technology to transfer data at a very high rate i.e. at several Mbit/s. In such DSL transmission systems, a data flow rate is allocated to each subscriber. For instance, in an Asymmetric DSL (ADSL) system, a subscriber typically disposes of a bitrate comprised between 1 and 8 Mbit/s downstream (from the ADSL Central Office to the ADSL subscriber) and between 64 Kbit/s and 1 Mbit/s upstream (from the subscriber to the ADSL Central Office).

Figure 2:
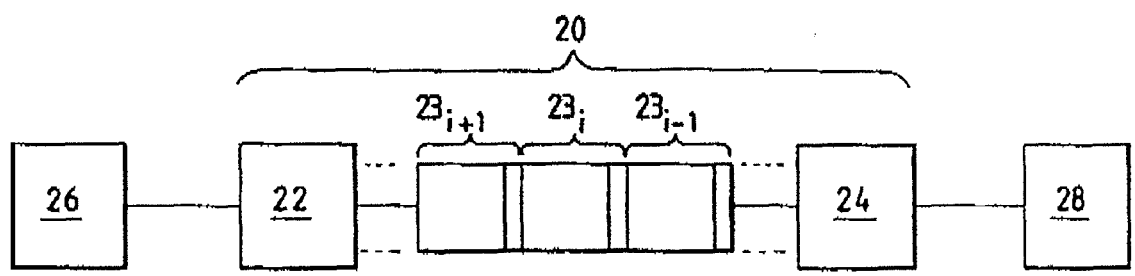
FIG. 2 represents a known DSL communication system using ATM transmission.

To operate correctly, a DSL system 20 (FIG. 2) using ATM technology requires a constant transmission of data between a transmitter server 22 and a receiver server 24, for instance for synchronisation purposes between such transmitter 22 and the receiver 24. Indeed, ATM cells must be continuously transmitted in the system 20, the boundaries of a cell $23_i$ being merged with the boundaries of a previous cell $23_{i-1}$ and a following cell $23_{i+1}$ cells, for the servers 22 and 24 to be synchronised.

The transmitted cell $23_i$ carries generally data provided by an end transmitter 26 connected to server 22, such data being addressed to an end receiver 28 connected to server 24. In case such end transmitter 26 does not provide data to be transmitted, server 22 transmits idle cells, i.e. cells according to the ATM standard which only carry information relating to their transmission, i.e. cells whose PL is empty.

Reference is made first to FIG. 1 which represents the structure of a conventional ATM user Network Interface cell.

Figure 3:
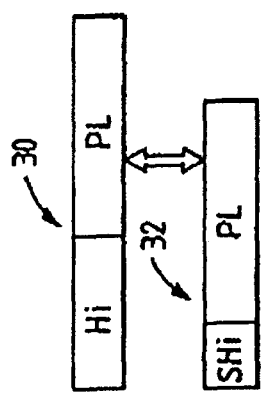
FIG. 3 represents a comparison between the structures of a cell transmitted in a known ATM communication system and a cell transmitted in an ATM communication system implementing the invention.

The embodiment of the invention described herein below increases the data transmission flow rate between an ATM transmitter and an ATM receiver linked through an ADSL communication system. For that purpose the number of bits allocated to the cell headers is reduced, each 5 octets header $H_i$ (FIG. 3) of a cell i to be transmitted in the ATM system being replaced by a shortened header $SH_i$ of one octet during such transmission. Thereby, a 53 octets size cell 30 transmitted in a known ATM system is transformed in a 49 octets size cell 32 in a system implementing the invention.

Such size reduction corresponds to a bitrate gain of $4/53=7.5\%$ allowing thereby to increase the ATM rate, i.e. allowing the system to carry more data. For instance, a link capable of transporting 1 Mbit/s ATM data can carry 1.075 Mbit/s by using this invention, without impact on power consumption or robustness of the link.

It should be noted that the increase of ATM bit rate can be used also to lower the transmit power and/or to increase robustness. In fact:

It is possible to send the same net bitrate at the same robustness, but at a lower transmit power, as in total, less bits have to be transported, what can be done at less power; an example of this property will be explained below.

It is possible to send the same net bitrate at the same power, but with increased robustness, as the Signal-to-noise ratio will be larger due to less data to transport at same power.

As an example of power consumption saving, if the ADSL system has a bitrate of B and a number N of used tones in a Discrete MultiTone (DMT) system (as is, e.g., ADSL), the power gain is:

$$(B*0.075)/(4000*N)*3 \text{ dB}$$

This formula results from the fact that there is 3 dB gain if each used tone carries 1 bit less per DMT symbol. So, the bitrate gain, being B*0.075 divided by the number of DMT symbols per second, and divided by the number of tones, results in the number of times 3 dB.

Considering that 4.3 Mbit/s are carried over 200 tones, then gain on power consumption is:

$$(4.3M*0.075)/(4000*200)*3 \text{ dB}=1.209 \text{ dB}$$

Thus, an amplifier requiring 1 Watt without header compression according to the present invention, will require 1.231 times less power with such header compression, i.e. 0.757 Watt of consumption and 242 milliWatts of reduction.

Figure 4:
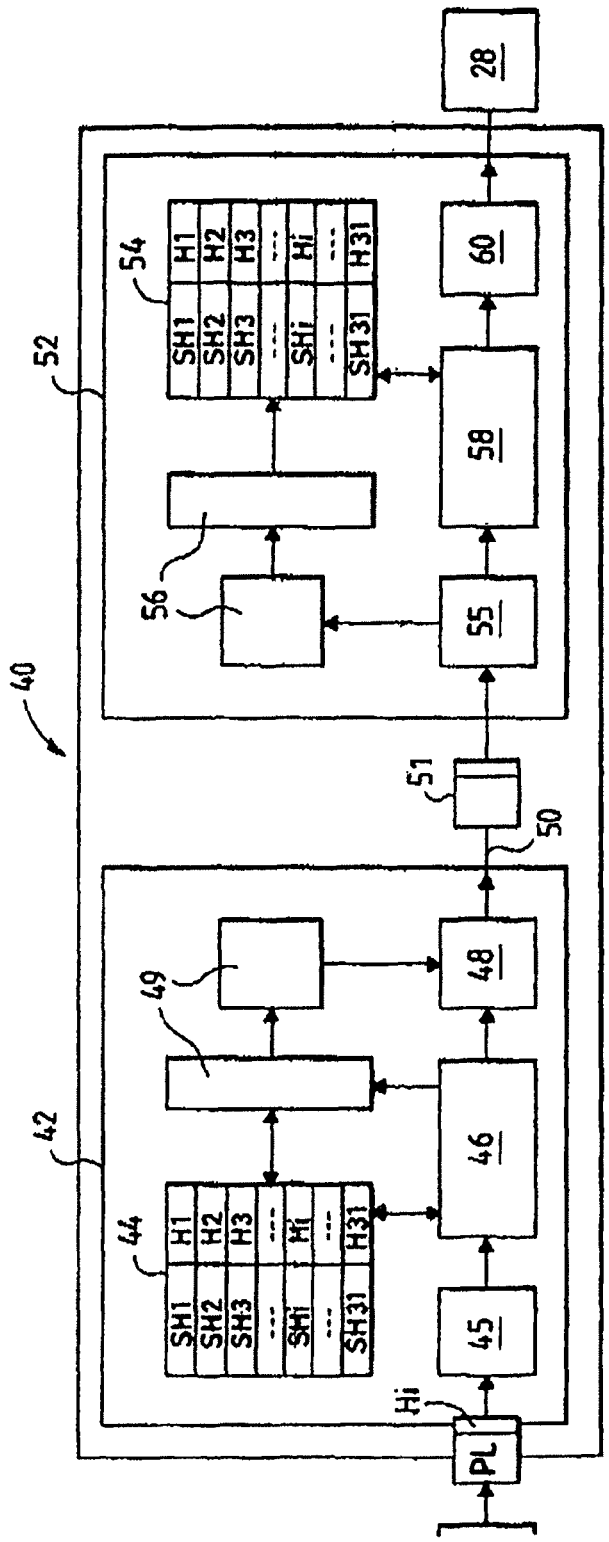
FIG. 4 represents a DSL communication system using ATM transmission of data according to the invention.

To carry such header reduction, tables of correspondence associating one full header $H_i$ (5 octets) to one shortened header $SH_i$ (1 octet) are used by both the transmitter and the receiver of the shortened header cells. The creation and the operation of such tables are described herein below in relation to an ADSL system 40 (FIG. 4) using ATM transmission.

In such an ADSL system 40, data is transmitted by an end user 26 to the ADSL system 40 via a server 42. Such transmission from end user 26 to transmitter 42 is identical to known transmission of data from an end user 26 to a transmitter server 22 as described with FIG. 2.

According to the invention, the server 42 comprises a table 44 of conversion which allows the replacement in each cell to be transmitted of its 5 octets header $H_i$ by a shortened header $SH_i$ of 1 octet, such operation being described in detail later. Thereafter, server 42 transmits the received data under the new (reduced) size, i.e. by cells of 49 octets through the ADSL carrying medium 50.

A server 52 receives such 49 octets shortened cells and transforms each shortened cell into a 53 octets cell by using a table 54 which associates a 5 octets header $H_i$ to each shortened header $SH_i$, as described in detail later. Thereafter, 53 octets cells are transmitted from the receiver 52 to the end receiver 28 to which those cells are addressed.

Indeed, one advantage of this embodiment lies in that end users 26 and 28 do not have to modify their connections to the communication system 40 to take advantage of the header reduction, i.e to benefit of an increased data transmission flow rate.

The header reduction operations require the use of a table 54 which replaces each received short header $SH_i$ by the corresponding or associated full header $H_i$. It is recalled here that table 44 replaced the full header $H_i$ by an associated short header $SH_i$.

Tables 44 and 54 are filled via a communication protocol between transmitter 42 and receiver 52 allowing receiver 52 to be informed about which shortened header $SH_i$ and which full header Hi have been associated. Thereby, receiver 52 can replace each shortened header $SH_i$ by the associated full header $H_i$.

This communication protocol uses three different kinds of cells, each kind of cell being characterised by its shortened header $SH_i$ and its PayLoad PL.

The first kind of cell, called idle cell, has a shortened header in the form [11111XXX] wherein XXX corresponds to any combination of bits performing an Header Error Control. Such cell is an idle cell if its PayLoad is defined in the ATM standards, being hexadecimal 6A in all of its 48 bytes.

A second kind of cell, called associating cell, has an identical shortened header [11111XXX] wherein XXX corresponds to any combination of bits performing an Header Error Control. But in this case, the PayLoad carries data to associate 4 full headers Hi with shortened headers SHi (more details will be provided herein above).

A third kind of cell, called a data cell, is defined by a header of the form [ABCDEXXX] wherein ABODE is different from 11111 and XXX corresponds to any combination of bits performing an Header Error Control. Such cell is considered as a cell transmitting data in its Payload and whose header has been shortened. Thus, such cell should be treated by receiver 52 to replace its shortened header $SH_i$ [ABCDEXXX] by a full 5 octets header. The use of such protocol modifies the structure of Tables 44 and 54, as shown hereinafter with Tables 44a and 44b.

TABLE 44a

| Block number | Shortened header (1 octet) | Active (1 bit) | Age (3 bits) (*) | Retransmit (2 bits) (*) | Full ATM header (5 octets) |
|---|---|---|---|---|---|
| 0 | 00000xxxb | 0 | 0 | 0 | |
|  | 00001xxxb | 0 | 0 | | |
|  | 00010xxxb | 0 | 0 | | |
|  | 00011xxxb | 0 | 0 | | |
| 1 | 00100xxxb | 0 | 0 | 0 | |
|  | 00101xxxb | 0 | 0 | | |
|  | 00110xxxb | 0 | 0 | | |
|  | 00111xxxb | 0 | 0 | | |
| ... | ... | ... | ... | ... | |
| 7 | 11100xxxb | 0 | 0 | 0 | |
|  | 11101xxxb | 0 | 0 | | |
|  | 11110xxxb | 0 | 0 | | |
|  | 11111xxxb | 1 () | 0 () | | Full idle cell header |

(**): these values are hard coded, and can never change value.

Table 44a represents the structure of the transmitter table 44 at the initialization of the system. It comprises a first column "block number" which identifies 8 different kinds of blocks, each block being composed of 4 lines. Each line corresponds to an unique shortened header $SH_i$ identified through the specific combination ABCDE of the five first bits of each shortened header SHi [ABCDEXXX].

To each one of this shortened header $SH_i$ is attributed a full ATM header $H_i$ of 5 octets, such header $H_i$ being represented in the column "full ATM header (5 octets)" at the same line as the $SH_i$ to which it is associated.

Such column "full ATM header (5 octets)" is empty except for last entry for idle cells, since table 44a has been represented at the initialisation of the system 40 whereas table 44 is filled in parallel to the transmission of shortened header cells, i.e. to the transmission of data.

More precisely, each time transmitter 42 receives a cell i to be transmitted, an ATM cells receiver 45 informs a header replacer 46 of such transmission. Header replacer 46 checks table 44 to determine whether a shortened header $SH_i$ has already been associated to the full header $H_i$ of such cell i.

Since, at the initialization of the system, such associations between shortened header $SH_i$ and full header $H_i$ have not already been performed, header replacer 46 replaces the header $H_i$ with available shortened header $SH_i$, i.e. a shortened header SHi which has not been already associated to an header $H_i$. An available SHi has its <<Active>> bit set to zero.

Each time an association between a full header $H_i$ and a shortened header SHi is performed, the line of table 44 corresponding to the shortened header SHi is updated with such association, i.e. the full header is indicated in the column "Full ATM Header (5 octets)". For instance, considering that the first cell received has an ATM header in the form $[O_aO_b O_cO_dO_e]$ wherein $O_i$ represents an octet of data, a shortened header [00001XXX] might be associated to such header, and the Table 44a is transformed into Table 44b.

TABLE 44b

| Block number | Shortened header (1 octet) | Active (1 bit) | Age (3 bits) (*) | Retransmit (2 bits) (*) | Full ATM header (5 octets) |
|---|---|---|---|---|---|
| 0 | 00000xxxb | 0 | 0 | 11 | |
|  | 00001xxxb | 1 | 0 | | $[O_aO_bO_cO_dO_e]$ |
|  | 00010xxxb | 0 | 0 | | |
|  | 00011xxxb | 0 | 0 | | |
| 1 | 00100xxxb | 0 | 0 | 0 | |
|  | 00101xxxb | 0 | 0 | | |
|  | 00110xxxb | 0 | 0 | | |
|  | 00111xxxb | 0 | 0 | | |
| ... | ... | ... | ... | ... | |
| 7 | 11100xxxb | 0 | 0 | 0 | |
|  | 11101xxxb | 0 | 0 | | |
|  | 11110xxxb | 0 | 0 | | |
|  | 11111xxxb | 1 () | 0 () | | Full idle cell header |

(**): these values are hard coded, and can never change value.

Thereafter, the whole block 0 of data determining this association is transmitted to table 54 through the communication protocol already described. Indeed, such block 0 is transmitted to the receiver 52 through an associating cell 51 having a header of the form [11111XXX] and a PayLoad of the form: 4 series of twice identical 6 bytes, where each 6 bytes sequence contains 5 bytes full header+3 bits block number+_4 bits dummy+1 bit entry active state. In this case:

[(00000+000/0000/0)+(00000+000/0000/0)+($[O_aO_b$-$O_cO_dO_e]$+000/0000/1)+($[O_aO_bO_cO_dO_e]$+000/ 0000/1)+(00000+000/0000/0)+(00000+000/ 0000/0)+(00000+000/0000/0)+(00000+000/ 0000/0)+

Receiver 52 comprises a shortened cells receiver 55 which recognizes the different kinds of shortened cells. At the reception of such associating cell 51, shortened cells receiver 55 informs table 54 of the association between the shortened header [00001] and the full header $[O_aO_bO_cO_dO_e]$.

Therefrom, shortened header replacing means 58 replaces such shortened header [00001] by such full header $[O_aO_b$-$O_cO_dO_e]$, a full header transmitter 60 sending a complete 53 octets cell thereafter to its final receiver 28.

According to this operation, tables 44 and 54 memorised the associations performed between full and shortened headers at the initialization of the system until such tables are completely filled, i.e. all the shortened headers SHi have been associated to corresponding full headers $H_i$. In this case, cells having a header $H_i$ not identified in the table 44 require a special treatment to operate the header reduction operation. For that purpose, three parameters are considered to qualify each association between a shortened header SHi and a full header $H_i$.

Firstly, a parameter indicates the "active" status of each shortened header SHi, i.e. whether such SHi is already associated to a full header. The column "active" of table 44 indicates such information to which 1 bit is allocated, this bit being equal to zero from the initializaton of the system until the shortened header SHi is associated to a full header.

Secondly, a parameter indicates the duration (Age) during which an ATM connection has not been used. Three bits are allocated in the column "Age" to represent such duration. Each age is set to zero at the start of creation of the association and each time an ATM cell is transmitted with this shortened header SHi. The "Age" is automatically incremented by one, each second that the association is active. The value saturates at value 7. So, value 7 is reached when, during at least 7 last and consecutive seconds, no cells with such shortened header SHi has been sent.

Thirdly, a parameter "Retransmit", coded with two bits, is used to control the number of times each association (shortened header SHi/full header $H_i$) is transmitted from table 44 to table 54 through associating cells.

Indeed, each time an associating cell is transmitted, such transmission is repeated three times to ensure that table 54 is updated with such new association. For that purpose, each time a shortened header SHi is associated to a full header Hi, the "Retransmit" value of such association is set to three and decrements of one each time an associating cell relating to such association is transmitted.

An associating cell can only be transmitted when an idle cell is to be sent between transmitter 42 and receiver 52. Thus, when an idle cell is to be transmitted, the retransmit value of all the blocks is checked and, if one value is different from zero, one associating cell referring to such block is sent instead of the idle cell. Otherwise, an idle cell is transmitted. Also, at creation of a new entry in the transmitter table, transmitter first forces the transmission of a associating cell before sending the cell with newly generated shortened header.

The active and age parameters allow to associate a full header with a shortened header SHi when table 44 is completely filled. Indeed, if a shortened header SHi is indicated as inactive ("active" value being equal to 0), such shortened header SHi can be associated to a full header Hi.

Otherwise, the shortened header SHi indicated by the highest age of the table is overwritten, i.e. such shortened header is associated to a new full header Hi.

The receiver 52 comprises means to delineate the cells. Indeed, as a byte stream is received, the receiver must reconstruct cell boundaries. To this end, it is possible to use a technique similar to the cell delineation technique used for ATM cells with full header, as defined in ATM standard [ITU I.432]. However, as the probability of making errors on the Header Error Control check is higher, due to the use of only 3 bits, it is preferable to increase the number of aligned cells required to get into cell delineation synchronisation state (called delta value) and to loose cell delineation synchronisation state (called alfa value).

At the receiver 52, when the shortened header SHi of a received cell 51 is inactive, the cell is discarded, i.e. considered as if it was an idle cell. Such idle cells are identified if the shortened header SHi has the form [11111XXX] and the Header Error Check does not succeed over the eight bytes on position N×6 with N equal 0 to 7 in the cell payload. Indeed, if such Header Error Check succeeds over the mentioned payload bytes on those positions, and all octets N, N+1, . . . , N+5=N+6, . . . , N+10 (check per octet) for N=0, 12, 24 and 36, then an associating cell has been received in order to update a block of table 54. For that purpose, a block number and four associations between shortened headers SHi and full headers Hi are extracted from the payload of such cell and the block of the cell is updated with such associations, i.e. they overwrite the already existing associations.

The invention claimed is:

1. A method to transmit, via a transmitting apparatus, at least one data cell or packet having a shortened overhead section and a payload section, comprising:
translating, at said transmitting apparatus, an overhead section of a data cell or packet to be transmitted into a shortened overhead section,
wherein for translation of said overhead section into said shortened overhead section a table of overhead sections and corresponding shortened overhead sections is maintained at a transmission side,
wherein if said overhead section is not stored in said table, said overhead section and an associated shortened overhead section are stored in a new entry of said table,
and wherein said new entry is communicated from a transmission side toward a reception side via at least an asynchronous transfer mode (ATM) idle cell.

2. The method according to claim 1 wherein said new entry is communicated using the payload section of one of a data cell and packet.

3. The method according to claim 1 wherein said new entry includes information related to a couple of an overhead section and a corresponding shortened overhead section.

4. A device to transmit at least one data cell or packet having a shortened overhead section and a payload section, said device comprising:
a processor configured to translate an overhead section of one of a data cell and packet to be transmitted into a shortened overhead section;
a memory which maintains for translation of said overhead section into said shortened overhead section, a table of overhead sections and corresponding shortened overhead sections and stores for an overhead section not stored in said table, said overhead section and said associated shortened overhead in a new entry of said table; and
a transmitter configured to transmit said new entry via at least an asynchronous transfer mode (ATM) idle cell.

5. A device to receive at least one data cell and packet having a shortened overhead section and a payload section, said device comprising:
a processor configured to translate a shortened overhead section of a data cell or packet to be received into an overhead section; and
a memory which maintains for translation of said shortened overhead section into said overhead section, a table of overhead sections and corresponding shortened overhead sections; and
a receiver configured to receive a new entry for said table via at least an asynchronous transfer mode (ATM) idle cell,
wherein said received new entry is stored in said table.

* * * * *